(12) United States Patent
Vanstone

(10) Patent No.: US 6,212,281 B1
(45) Date of Patent: Apr. 3, 2001

(54) DIGITAL SIGNATURE PROTOCOL

(75) Inventor: Scott A. Vanstone, Waterloo (CA)

(73) Assignee: Certicom Corp., Ontario (CA)

( * ) Notice: Subject to any disclaimer, the term of this patent is extended or adjusted under 35 U.S.C. 154(b) by 0 days.

(21) Appl. No.: 08/949,030

(22) Filed: Oct. 10, 1997

(30) Foreign Application Priority Data

Oct. 11, 1996 (GB) .................................................. 9621274

(51) Int. Cl.$^7$ ........................................................ H04L 9/00
(52) U.S. Cl. ......................... 380/282; 380/281; 380/283; 380/285; 380/45; 713/176; 713/177; 713/180
(58) Field of Search ................................ 380/21, 30, 43, 380/51, 243, 246, 255, 258, 259, 260, 262, 282, 283, 284, 28; 705/60, 67; 713/168, 169, 170, 171, 176, 177, 179, 180

(56) References Cited

U.S. PATENT DOCUMENTS

| | | | |
|---|---|---|---|
| 4,641,347 | * 2/1987 | Clark et al. ................................ | 380/3 |
| 4,660,221 | * 4/1987 | Dlugos ...................................... | 380/23 |
| 4,796,193 | * 1/1989 | Pitchenik .......................... | 364/464.02 |
| 4,881,264 | * 11/1989 | Merkle ...................................... | 380/25 |
| 4,947,430 | * 8/1990 | Chaum ...................................... | 380/25 |
| 5,018,196 | * 5/1991 | Takaragi et al. ......................... | 380/30 |
| 5,208,858 | 5/1993 | Vollert et al. ............................ | 380/43 |
| 5,245,657 | * 9/1993 | Sakurai .................................... | 380/25 |
| 5,351,297 | * 9/1994 | Miyaji et al. ............................. | 380/28 |
| 5,442,707 | * 8/1995 | Miyaji et al. ............................. | 380/30 |
| 5,479,515 | * 12/1995 | Longacre, Jr. ............................ | 380/54 |
| 5,499,294 | 3/1996 | Friedman ................................. | 380/10 |
| 5,581,616 | * 12/1996 | Crandall .................................. | 380/28 |
| 5,608,801 | 3/1997 | Aiello et al. ............................. | 380/46 |
| 5,638,446 | 6/1997 | Rubin ...................................... | 380/25 |

FOREIGN PATENT DOCUMENTS 0639907   2/1995  (EP) .

OTHER PUBLICATIONS

Bruce Schneier; "Applied Cryptography, Second Edition", John Wiley & Sons, Oct. 18, 1995, pp. 37–39 and pp. 476–479.*

* cited by examiner

Primary Examiner—Tod Swann
Assistant Examiner—Paul E. Callahan
(74) Attorney, Agent, or Firm—Finnegan, Henderson, Farabow, Garrett & Dunner, L.L.P.

(57) ABSTRACT

A digital signature protocol generates a signature component using a hash of an encrypted message. The component and encrypted message form a signature pair that is forwarded to a recipient. The encryption message is used to retrieve the encryption key at the recipient and authenticate information in the message. The signature pair may be applied to a data carrier as a bar code for use in mail delivery services. By utilizing a hash of the message, a reduced message length is achieved as individual signatures are not required for each component of the message.

13 Claims, 3 Drawing Sheets

DIGITAL SIGNATURE PROTOCOL

The present invention relates to digital signature protocols. Public key encryption schemes are well known and utilize a public key and a private key that are mathematically related. The more robust are based upon the intractability of the discrete log problem in a finite group.

Such public key encryption systems utilize a group element and a generator of the group. The generator is an element from which each other group element can be obtained by repeated application of the underlying group operation, ie. repeated composition of the generator. Conventionally, this is considered to be an exponentiation of the generator to an integral power and may be manifested as a k fold multiplication of the generator or a k fold addition of the generator depending upon the underlying group operation. In such a public key encryption system, an integer k is used as a private key and is maintained secret. A corresponding public key is obtained by exponentiating the generator $\alpha$ with the integer k to provide a public key in the form $\alpha^k$. The value of the integer k cannot derived even though the exponent $\alpha^k$ is known.

The public and private keys may be utilized in a message exchange over a data communication system where one of the correspondents may encrypt the data with the recipient's public key $\alpha^k$. The recipient receives the encrypted message and utilizes his private key k to decrypt the message and retrieve the contents. Interception of the message will not yield the contents as the integer k cannot be derived.

A similar technique may be utilized to verify the authenticity of a message by utilizing a digital signature. In this technique, the transmitter of the message signs the message with a private key k and a recipient can verify that the message originated from the transmitter by decrypting the message with the transmitter's pubic key $\alpha^k$. A comparison between a function of the plain text message and of the recovered message confirms the authenticity of the message.

Various protocols exist for implementing a digital signature scheme and some have been widely used. In each protocol, however, it is necessary to guard against an existential attack where an impostor may substitute a new message within the transmission that leads the recipient to believe he is corresponding with a particular individual. Once such authentication is established, then the recipient may disclose information that he should not or incorrectly attribute information to the sender.

To avoid an existential attack, it is usual for the message to include some redundancy, e.g. by repeating part or in some cases all of the message. This provides the function of the message that confirms authenticity. The redundancy provides a pattern within the recovered message that would be expected by the recipient. Any tampering with the message would be unlikely to produce such a pattern when decrypted and so would be readily detected.

The redundancy does, however, increase the message length and therefore the bandwidth necessary to transmit the message. Generally this is undesirable and its effect is seen as a reduced message transmission rate. In some applications, however, the length of the message is critical as the signed message may be reproduced as a printed document and the length of the message then influences the size of the printed document. Such an application is in a mail environment where a bar code may be used to indicate destination, postage, rate, and the sender. To avoid fraud, the message is digitally signed by an authority and a digital bar code compiled that represents the information contained in the signed message. The bar code representation has particular physical limitations for readability and to avoid errors caused by e.g. ink bleeding. As a result, a long message produces a bar code that is unduly large, particularly where the redundancy required to avoid the existential attack is provided by repetition of the whole message.

The length of the message is particularly acute with digital signatures of messages that are composed of discrete blocks, as for example in such a mail environment. In a conventional signature protocol, a short term secret key k, (the session key), is selected and used to exponentiate the generator $\alpha$ of the underlying group to obtain a short term public key $r=\alpha^k$. A bit string, r', is derived from r and is used to encrypt the message m to obtain ciphertext e, that is $e=E_{r'}(m)$ where $E_{r'}$ signifies the application of an encryption algorithm with the key r' to the message (m).

A signature component, s, is generated that contains information to enable the authenticity of the signature to be verified. The nature of the signature component depends upon the protocol implemented but a typical exemplary protocol utilizes a signature component s of the form s=ae+k mod (n) where n is the order of the group. The values of the signature pair s,e forwarded.

In this protocol, the recipient calculates $\alpha^s(\alpha^{-a})^e$, where $\alpha^{-a}$ is the public key of the sender, to obtain $\alpha^k$ which represents the short term public key r.

The ciphertext e can then be decrypted using the key r' to retrieve the message m.

With a message composed of multiple blocks, ie. $m=m_1$; $m_2$; $m_3$, the ciphertext e can be obtained for block $m_1$ and the corresponding pair s,e forwarded. However, signature component s is dependent upon the encryption of the first block which leaves the subsequent blocks vulnerable. It is therefore necessary to sign each block and forward multiple signatures, all of which increases the length of the message.

It is therefore an object of the present invention to obviate or mitigate the above disadvantages.

In general terms, the present invention generates an encrypted message string, e, with a key, r', and the ciphertext is forwarded to the recipient. The encrypted message string e is also processed by a hash function and the resulting hash e' utilized in the signature s. The recipient recovers the message by hashing the message string e and utilizes the value to recover the encryption key, r'. The message can then be recovered from the message string e.

If appropriate, the redundancy may be checked to ensure the accuracy of the message but only one signature pair needs to be transferred. Since the signature is generated from the hash of the encrypted message string e, individual blocks of data cannot be altered.

As a further preference, the certificate accompanying the message may be incorporated into the message as one of the blocks and signed. The certificate will have the requisite redundancy for authentication but because the hash of the string is used in the signature, the balance of the blocks do not need any redundancy. Accordingly, a shorter message can be utilized.

Embodiments of the invention will now be described by way of example only, with reference to the accompanying drawings, in which FIG. 1 is a schematic representation of a data communication system;

Figure 1:
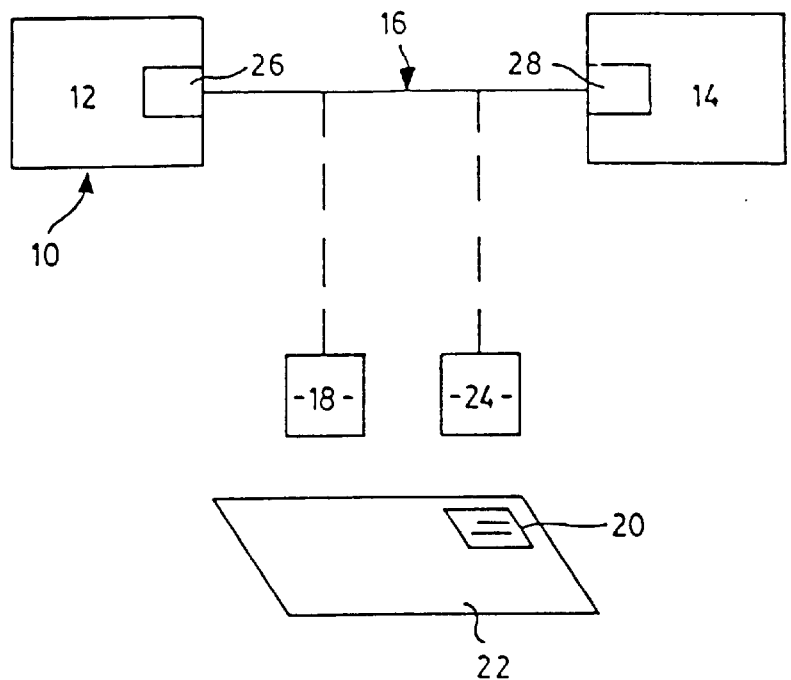

Referring therefore to FIG. 1, a data communication system 10 includes a pair of correspondents 12,14 and a communication channel 16. As indicated by solid line, the communication channel 16 may be a continuous channel between the two correspondents 12,14 so that digital information may be transferred between the correspondents. It will be understood, however, that the channel 16 may be interrupted as indicated in chain dot lines so that the sender 12 communicates with a bar code assembler 18 which receives digital information, converts it to a bar code and prints bar code indicia 20 on an envelope 22. The indicia 20 may then be read with a bar code reader 24 and the recovered message communicated to the recipient 14.

Each of the correspondents 12,14 includes an encryption unit 26,28 respectively that may process digital information and prepare it for transmission through the channel 16 as will be described below.

Figure 2:
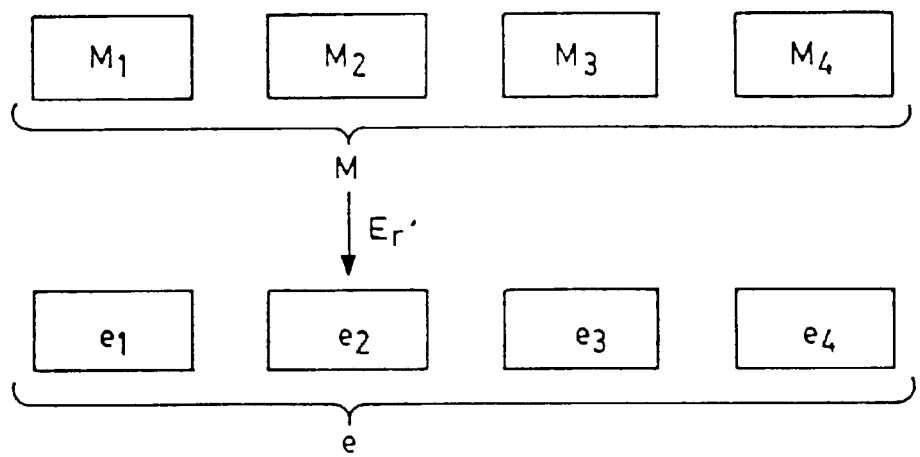
FIG. 2 is a schematic representation of a block of messages.

As may be seen from FIG. 2, the correspondent 12 wishes to generate a digital message m that may be encrypted and applied through the bar code assembler to the envelope 22. The digital message m consists of a plurality of discrete blocks $m_1, m_2, m_3$ . . . , each of which represents a particular piece of information. For example, the message $m_1$ may be the sender's address, the message $m_2$ may be the recipient's address, the message $m_3$ may be the postal rate applied, and the message $m_4$ may indicate the postage charged and act as an electronic debit.

In order to sign digitally the message m, the correspondent 12 processes it through the encryption unit 26. The unit 26 includes a number generator 30 which selects a random integer k and calculates a short term public key r at exponentiation unit 32. The unit 26 may operate under any of the established encryption schemes but a particularly beneficial implementation is that using elliptic curves over a finite field. The short term public key r is derived from the generator of the group a that is exponentiated to the integer k so that $r=\alpha^k$. In an elliptic curve implementation, the underlying field operation is addition so that "exponentiation" is obtained by k fold addition of a point P so that the public key is a point kP on the curve.

A bit string r' is obtained from r by application of a predetermined algorithm, such as a modulo reduction or, where the implementation is over an elliptic curve, one coordinate of the point representing the public key and utilized as a key by the encryption unit to encrypt each of the blocks $m_1, m_2$, etc. at encryption module 34. The encrypted blocks $e; e_2; \ldots$ are concatenated to form a message string e where $e = e_1 // e_2 // \ldots e_k$ and where in general $e_i = E_{r'}(m_i)$ in a register 36.

The encryption unit 26 includes a hash function h indicated at 38 which processes the ciphertext string e to produce a shortened bit string comprising hash e'. Suitable hash functions are as secure one-way cryptographic hash functions such as SHA.

A signature component s is then generated by an arithmetic unit 40 using the hash e' and the private key k from which the encryption key r is derived. A suitable component has the form $$s = ae' + k \mod(n),$$

where a is the long-term private key of the correspondent 12, and k is the short-term private key selected by the correspondent 12.

The encryption unit assembles the message and sends as the signature pair the message string e and the signature component s from a transmitter 42 through the channel 16. When used as a mail system, the message may then be compiled into a discernible code, such as a two-dimensional bar code, applied as indicia 20 to data carrier 22 as indicated in FIG. 1 and subsequently read by the recipient 14. The indicia 20 may be visibly discernible, as in a printed bar code, may be magnetically discernible by printing with magnetic ink or could be optically readable by a laser according to the particular application.

Upon receipt by the recipient 14 at receiver 50, the encryption unit 28 initially calculates the hash value e'* by hashing the received message string e with the hash function h as indicated at 52. A public key r* related to the integer k is then calculated in arithmetic unit 54 using operations in the underlying field to exponentiate the generator α with the received value of the component s and exponentiating the public key of the correspondent 12 with the computed hash value e'*, that is $$r^* = \alpha^s (\alpha^{-a})^{e'^*}$$

An encryption key r*' is then derived from the recovered public key.

An encryption module 56 then processes the received message string e using the encryption key r*' to recover the message m. The message m will include the requisite redundancy which can be checked to ascertain the authenticity of the message.

Figure 3:
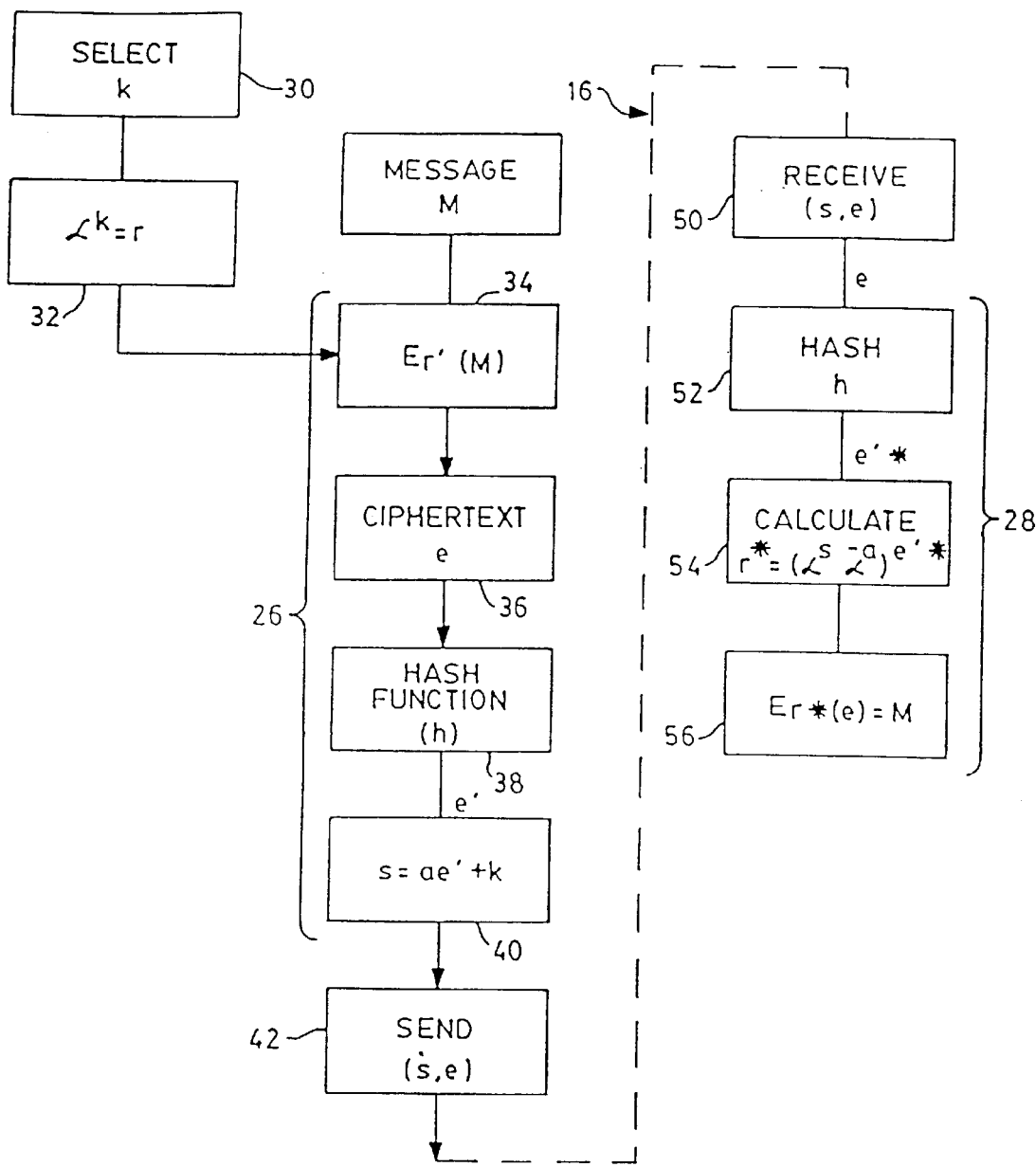
FIG. 3 is a flow chart showing the generation of a digital signature and recovery of a message.

It will be understood that the procedure outlined in FIG. 3 may be implemented as software and performed on a general purpose computer or may be implemented in a special purpose integrated circuit.

It will be noted that the hash value e' is a hash of all the encrypted blocks that are concatenated and so it is not possible to tamper with one of the blocks without affecting the resultant hash value. However, although multiple blocks are sent and recovered, only one signature is required which reduces the overall message length.

Figure 4:
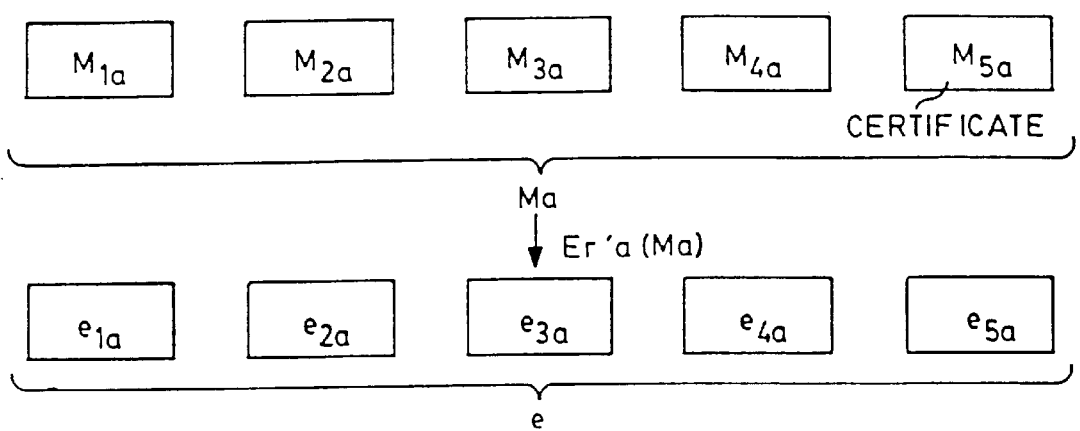
FIG. 4 is a schematic representation similar to FIG. 2 of an alternative embodiment.

A further embodiment is shown in FIG. 4 in which like reference numerals will indicate like parameters, with the suffix 'a' added for clarity.

In the embodiment of FIG. 4, a certificate issued by a secure authority is included as a message block $m_{5a}$ within the message m. The certificate includes sufficient information to permit authentication of the public key of the correspondent 12 and the parameters of the underlying system. The message string e is assembled as indicated above by encrypting each of the blocks to provide a string $e_{1a}, e_{2a}$, etc., including the certificate $m_{5a}$.

The hash $e'_a$ is then obtained and used to generate a signature component $s_a$ of the form $$s_a = ae'_a + k \mod(n).$$

Upon recovery by the recipient 14, the recovered message will include the certificate $m_{5a}$ which will exhibit the requisite redundancy as part of the underlying system parameters. The redundancy of the certificate $m_{5a}$ therefore authenticates the message m and avoids the need for redundancy in the additional blocks. However, as previously, since the hash used in the signature s is a hash of all of the blocks, it is not possible to substitute one block within the message while retaining the authenticity of the signature.

It will be understood that the signature component s may be of any suitable form commonly used in digital signature protocols that allow the recovery of the short term public key and hence the encryption key from a hash of the encrypted message.

The embodiments of the invention in which an exclusive property or privilege is claimed are defined as follows:

1. A digital signature protocol for authenticating digital information transmitted by one correspondent to another over a data communication system, at least said one correspondent having long-term private key and corresponding long-term public key associated therewith, said protocol comprising the steps of said one correspondent generating a short term public key from an integer k, encrypting a message m containing said information with an encryption key derived from said short term public key, to provide a ciphertext e of said message, applying a hash function to said ciphertext to provide a hash e', generating a signature component, s, incorporating said hash e', said long-term public key and said integer k, forwarding a signature pair including said ciphertext e and said component s to said other correspondent, hashing said ciphertext e received by said other correspondent with said hash function to obtain a received hash e'*, using said received hash e'*, and said long-term public key to recover said encryption key from said signature component, and retrieving said message m from said ciphertext e by application of said encryption key recovered from said signature component.

2. A digital signature protocol according to claim 1 wherein said cyphertext is applied as a discernible code to a data carrier for transfer from one correspondent to said other.

3. A digital signature protocol according to claim 2 wherein said code is a two-dimensional bar code.

4. A digital signature protocol according to claim 1 wherein said message includes certificate to authenticate said public key corresponding to said long term private key.

5. A digital signature protocol according to claim 1 wherein said signature component s has the form s=ae'+k where a is said long term private key, e' is said hash of ciphertext e and k is said integer.

6. A digital signature protocol according to claim 1 wherein said message is composed of a plurality of discrete messages, each of which is encrypted and compiled to form said ciphertext.

7. A digital signature protocol according to claim 1 wherein said public key is derived from a point on an elliptic curve.

8. Apparatus to generate a digital signature of a message m for transmission over a data communication system, said apparatus comprising an exponentiator to generate a public key r from a short-term private key k, an encryption module to encrypt said message m with a key derived from said public key r, and generate a ciphertext e, a hash function to operate on said ciphertext e and produce a hash e' of said ciphertext, an arithmetic unit to generate a signature component incorporating said hash e' and said private key k and a long-term private key, a, and a transmitter to transmit a signature pair comprising said signature component and said ciphertext over said communication system.

9. Apparatus according to claim 8 wherein said arithmetic unit generates a signature component of the form s=ae'+k where a is a second private key, e' is said hash of ciphertext e, and k is said private key.

10. Apparatus according to claim 8 including a bar code generator to produce a discernible bar code of said signature pair on a carrier.

11. Apparatus to verify a digital signature received over data communication system, said apparatus including a receiver to receive a signature pair including ciphertext, e, and a signature component s incorporating a short term private key k, a long-term private key, a, and a hash e' of ciphertext, e, of a message m, a hash function to operate on said ciphertext e and provide a hash e'*, an arithmetic unit to recover an encryption key correlated to said private key k and an encryption module to apply said encryption key to said ciphertext and recover said message m.

12. Apparatus according to claim 11 wherein said signature component is of the form s=ae'+k where a is a long-term private key, e' is a hash of said ciphertext e, and k is said private key.

13. Apparatus according to claim 11 including a bar code reader to read a bar code representing said signature pair on a carrier.

* * * * *